Patented Jan. 4, 1944

2,338,286

UNITED STATES PATENT OFFICE 2,338,286

PROCESSING OF ELASTIC POLYCHLOROPRENE

Louis H. Howland, Cheshire, Conn., assignor to United States Rubber Company, New York, N. Y., a corporation of New Jersey No Drawing. Application May 3, 1941,
Serial No. 391,711

4 Claims. (Cl. 260—36)

The present invention relates to processing of rubber-like masses of polychloroprenes known to the trade as neoprene, and more particularly to methods of preparing plastic conversion products of that type of neoprene known as neoprene GN and similar polychloroprenes, and to the new resulting compositions.

Although ordinary rubber and neoprene have certain properties in common, it is known that they are diverse in their action to many chemicals. For example, benzothiazyl disulfide is sold as a vulcanization accelerator for use in natural rubber compounds, whereas it is sold as a retarder of vulcanization for use in neoprene compounds. Also, whereas heat tends to soften rubber, it has a hardening action on neoprene probably due to continued polymerization. Hence, the behavior of the present chemicals are empirical to neoprene.

The new plasticizers for the elastic polychloroprenes, denoted neoprene, whereby to provide new plastic conversion products thereof having decreased viscosity, have the formula

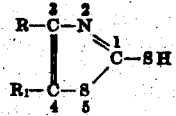

where R and R₁ represent radicals selected from the class consisting of hydrogen, alkyl, aralkyl, aryl, heterocyclic groups, and alkylene radicals common to the same cyclo-alkylene group. Where R and R₁ are separate radicals they may be like or unlike. The invention also extends to the derivatives of the free thiazoles (in which the mercapto-hydrogen is substituted or added to) which are capable of liberating the free thiazoles under the present condition of usage, e. g., the metal, ammonium, and substituted ammonium salts as well as the esters, e. g., the zinc ammonium, piperidyl, hexa methylene imine, diphenyl guanidine salts, dinitrophenyl, benzoyl esters; also the disulphides of the free thiazoles. The milling of the neoprene with the plasticizer should preferably be carried out in the absence of other compounding ingredients that would interfere with the plasticizing action of the chemicals. This last does not apply to other plasticizing agents, amines, dithiocarbamates and tetra alkyl thiuram disulphides, since they do not interfere with the said plasticizing action.

The chemicals are found to be such powerful plasticizers for neoprene that the neoprene can be markedly softened by mastication in air at ordinary temperatures.

The preferable amounts of the plasticizer for use in the neoprene during the mastication or milling are from 0.2 per cent to 2 per cent although smaller or larger amounts may be used if desired. The temperature of milling is the same as that for ordinary milling of neoprene GN compounds, for example, 70–150° F., although the invention is not limited to the temperature of milling.

The following examples are given in illustration of the invention, parts being by weight:

Example 1

The following mixes were made on a small mill.

| | A | B |
|---|---|---|
| Neoprene GN [1] | 100 | 100 |
| 1-mercapto-3-phenyl-thiazole | | 1.0 |

[1] The neoprene GN here used has the following chlorine, sulfur, and nitrogen analysis by weight: Cl 35.80%; N 0.27%; S 1.81%. Neoprene GN is believed made by polymerising chloroprene in the presence of sulfur with stabilization by a thiuram sulfide such as tetramethyl thiuram disulfide.

The chemical was added as soon as the neoprene was working well on the mill. The milling was conducted for 11½ minutes at about 194° F. Total milling time was the same on both A and B. Plasticities were then run on samples of these mixes in the Scott plastometer after 24 hours standing. The plastometer temperature was 212° F. and the plastometer reading was taken on the samples 60 seconds after the start. The test was run by standard procedure. The results were as follows:

| Time of milling | A | B |
|---|---|---|
| 11½ minutes | 553 | 135 |

The figures above are the remaining height in thousandths of an inch in thickness of a six-tenths inch thick sample of the respective mix.

The results plainly show that under the above conditions of processing, the mix B, containing 1-mercapto-3-phenyl thiazole, has been plasticized considerably more than the mix A containing no added chemical.

Example 2

Two other mercapto thiazoles were put into neoprene GN and mixes were made as follows:

| | A | B | C | D |
|---|---|---|---|---|
| Neoprene GN | 100 | 100 | 100 | 100 |
| 1-mercapto-3-ethyl thiazole | | 0.25 | | |
| 1-mercapto-3,4-dimethyl thiazole | | | | 1.0 |

Mixing and testing was conducted as under Example 1.

Results are as follows:

| Time of milling | A | B | C | D |
|---|---|---|---|---|
| 11½ minutes | 534 | 196 | 550 | 93 |

A divided mill was used for the milling and A and B were milled at the same time. Likewise C and D were milled at the same time. The results on B and D as compared to the blanks A and C definitely show a powerful plasticizing action for these two 1-mercapto thiazoles.

When the softened neoprene is compounded in the usual fashion, the resulting compounds vulcanize excellently and give vulcanizates that resist various types of heat aging better than vulcanizates that do not contain these chemicals.

Examples of other chemicals included in the scope of this invention are, 1-mercapto thiazole, 4-methyl-1-mercapto thiazole, 3-ethyl-1-mercapto thiazole, 1-mercapto-3,4-tetramethylene thiazole, 1-mercapto-3,4-dimethyl thiazole, 1-mercapto-3-butyl thiazole, zinc salt of 3-methyl-1-mercapto thiazole, zinc salt of 1-mercapto thiazole, zinc salt of 4-methyl-1-mercapto thiazole, zinc salt of 3-ethyl-1-mercapto thiazole, zinc salt of 1-mercapto-3,4-tetramethylene thiazole, zinc salt of 1-mercapto-3,4-dimethyl thiazole, zinc salt of 1-mercapto-3-butyl thiazole, hexamethylene imine salt of 3-methyl-1-mercapto thiazole, piperidine salt of 3-methyl-1-mercapto thiazole, piperidine salt of 1-mercapto thiazole, piperidine salt of 4-methyl-1-mercapto thiazole, piperidine salt of 3-ethyl-1-mercapto thiazole, piperidine salt of 1-mercapto-3,4-tetramethylene thiazole, piperidine salt of 1-mercapto-3,4-dimethyl thiazole, piperidine salt of 1-mercapto-3-butyl thiazole, diphenyl guanidine salt of 3-methyl-1-mercapto thiazole, diphenyl guanidine salt of 1-mercapto thiazole, diphenyl guanidine salt of 4-methyl-1-mercapto thiazole, diphenyl guanidine salt of 3-ethyl-1-mercapto thiazole, diphenyl guanidine salt of 1-mercapto-3,4-tetramethylene thiazole, diphenyl guanidine salt of 1-mercapto-3,4-dimethyl thiazole, diphenyl guanidine salt of 1-mercapto-3-butyl thiazole, ammonium salt of 1-mercapto-3-methyl thiazole, ammonium salt of 1-mercapto thiazole, ammonium salt of 4-methyl-1-mercapto thiazole, ammonium salt of 3-ethyl-1-mercapto thiazole, ammonium salt of 1-mercapto-3,4-tetramethylene thiazole, ammonium salt of 1-mercapto-3,4-dimethyl thiazole, ammonium salt of 1-mercapto-3-butyl thiazole, dinitrophenyl ester of 3-methyl-1-mercapto thiazole, dinitrophenyl ester of 1-mercapto thiazole, dinitrophenyl ester of 4-methyl-1-mercapto thiazole, dinitrophenyl ester of 3-ethyl-1-mercapto thiazole, dinitrophenyl ester of 1-mercapto-3,4-tetramethylene thiazole, dinitrophenyl ester of 1-mercapto-3,4-dimethyl thiazole, dinitrophenyl ester of 1-mercapto-3-butyl thiazole, benzoyl ester of 3-methyl-1-mercapto thiazole, benzoyl ester of 1-mercapto thiazole, benzoyl ester of 4-methyl-1-mercapto thiazole, benzoyl ester of 3-ethyl-1-mercapto thiazole, benzoyl ester of 1-mercapto-3,4-tetramethylene thiazole, benzoyl ester of 1-mercapto-3,4-dimethyl thiazole, benzoyl ester of 1-mercapto-3-butyl thiazole, piperidyl methyl-3-methyl thiazole sulfide, piperidyl methyl ester of 3-methyl-1-mercapto thiazole, piperidyl methyl ester of 1-mercapto thiazole, piperidyl methyl ester of 4-methyl-1-mercapto thiazole, piperidyl methyl ester of 3-ethyl-1-mercapto thiazole, piperidyl methyl ester of 1-mercapto-3,4-tetramethylene thiazole, piperidyl methyl ester of 1-mercapto-3,4-dimethyl thiazole, piperidyl methyl ester of 1-mercapto-3-butyl thiazole, the disulfide of 3-methyl-1-mercapto thiazole, disulphide of 1-mercapto thiazole, disulphide of 4-methyl-1-mercapto thiazole, disulphide of 3-ethyl-1-mercapto thiazole, disulphide of 1-mercapto-3,4-tetramethylene thiazole, disulphide of 1-mercapto-3,4-dimethyl thiazole, and disulphide of 1-mercapto-3-butyl thiazole, etc.

The invention may be applied to the conversion of all forms of neoprene including solid unvulcanized neoprene, reclaims, neoprene cements, neoprene dispersions, etc.

The present invention allows of converting elastic polychloroprene and particularly neoprene GN to a material which can more easily be processed in the factory.

Having thus described my invention, what I claim and desire to protect by Letters Patent is:

1. A process of preparing a plastic conversion product of an elastic polychloroprene which comprises milling a mixture containing the same and 1-mercapto-3,4-dimethyl thiazole, for a time and at a temperature sufficient to markedly reduce the viscosity of the polychloroprene.

2. A plastic conversion product of polychloroprene and 1-mercapto-3,4-dimethyl thiazole.

3. A plastic conversion product of polychloroprene and 1-mercapto-3,4-dialkyl thiazole.

4. A process of preparing a plastic conversion product of an elastic polychloroprene which comprises milling a mixture containing the same and 1-mercapto-3,4-dialkyl thiazole, for a time and at a temperature sufficient to markedly reduce the viscosity of the polychloroprene.

LOUIS H. HOWLAND.